United States Patent
Li et al.

(10) Patent No.: US 10,430,237 B2
(45) Date of Patent: Oct. 1, 2019

(54) RESOURCE SCHEDULING METHOD AND RELATED APPARATUS

(71) Applicant: Huawei Technologies Co., Ltd., Shenzhen (CN)

(72) Inventors: Jia Li, Xi'an (CN); Jie Liu, Xi'an (CN); Lifei Dang, Xi'an (CN); Lingzhi Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 15/584,661

(22) Filed: May 2, 2017

(65) Prior Publication Data
US 2017/0235602 A1 Aug. 17, 2017

Related U.S. Application Data

(63) Continuation of application No. PCT/CN2014/094581, filed on Dec. 23, 2014.

(51) Int. Cl.
*G06F 3/00* (2006.01)
*G06F 9/48* (2006.01)
(Continued)

(52) U.S. Cl.
CPC ............ *G06F 9/4881* (2013.01); *G06F 3/061* (2013.01); *G06F 3/0659* (2013.01);
(Continued)

(58) Field of Classification Search
CPC ....................................................... G06F 9/54
(Continued)

(56) References Cited

U.S. PATENT DOCUMENTS 8,055,689 B1 * 11/2011 Wookey ............ G06F 17/30575
707/814
8,601,487 B2 12/2013 Achterberg et al.
(Continued)

FOREIGN PATENT DOCUMENTS

CN 101431475 A 5/2009
CN 102508872 A 6/2012
(Continued)

OTHER PUBLICATIONS

Paolo Gai, Minimizing Memory Utilization of Real-Time Task Sets in Single and Multi-Processor Systens-on-a-chip. (Year: 2001).*
(Continued)

*Primary Examiner* — Lechi Truong
(74) *Attorney, Agent, or Firm* — Conley Rose, P.C.

(57) ABSTRACT

A resource scheduling method and a related resource scheduling apparatus to improve data input/output (IO) efficiency, where the method includes determining a current task queue, where the current task queue includes a plurality of to-be-executed application tasks, determining, for data blocks on a disk to be accessed by the application tasks, a quantity of times that each data block is to be accessed by the application tasks, determining a hotspot data block according to the quantity of times that each data block is to be accessed by the application tasks, and sending a move-in instruction to a local node of the hotspot data block, where the move-in instruction instructs to move the hotspot data block into a memory such that the hotspot data block can be accessed in the memory.

17 Claims, 9 Drawing Sheets

(51) Int. Cl.
*G06F 9/54* (2006.01)
*G06F 12/08* (2016.01)
*G06F 9/38* (2018.01)
*G06F 12/0871* (2016.01)
*G06F 12/123* (2016.01)
*G06F 3/06* (2006.01)

(52) U.S. Cl.
CPC .......... *G06F 3/0674* (2013.01); *G06F 9/3855* (2013.01); *G06F 9/546* (2013.01); *G06F 12/08* (2013.01); *G06F 12/0871* (2013.01); *G06F 12/123* (2013.01)

(58) Field of Classification Search
USPC .......................................................... 719/310
See application file for complete search history.

(56) References Cited

U.S. PATENT DOCUMENTS

| | | | |
|---|---|---|---|
| 2003/0191906 A1 | 10/2003 | Chen et al. | |
| 2008/0141256 A1* | 6/2008 | Forrer, Jr. ............... | G06F 3/061 718/103 |
| 2012/0020249 A1 | 1/2012 | Sundararaman et al. | |
| 2013/0212584 A1 | 8/2013 | Heit | |
| 2014/0250268 A1* | 9/2014 | Traut .................. | G06F 12/0862 711/113 |
| 2014/0331233 A1* | 11/2014 | Matskevich ............ | G06F 9/505 718/103 |

FOREIGN PATENT DOCUMENTS

| | | |
|---|---|---|
| CN | 102902593 A | 1/2013 |
| CN | 103186350 A | 7/2013 |
| CN | 103440207 A | 12/2013 |
| CN | 103838681 A | 6/2014 |
| EP | 1406174 A2 | 4/2004 |

OTHER PUBLICATIONS

Foreign Communication From a Counterpart Application, European Application No. 14908686.0, Extended European Search Report dated Oct. 17, 2017, 7 pages.
Machine Translation and Abstract of Chinese Publication No. CN101431475, dated May 13, 2009, 10 pages.
Machine Translation and Abstract of Chinese Publication No. CN102902593, dated Jan. 30, 2013, 10 pages.
Foreign Communication From a Counterpart Application, Chinese Application No. 201480077812.4, Chinese Office Action dated Sep. 28, 2018, 5 pages.
Machine Translation and Abstract of Chinese Publication No. CN102508872, dated Jun. 20, 2012, 12 pages.
Machine Translation and Abstract of Chinese Publication No. CN103440207, dated Dec. 11, 2013, 26 pages.
Machine Translation and Abstract of Chinese Publication No. CN103838681, dated Jun. 4, 2014, 14 pages.
Foreign Communication From a Counterpart Application, PCT Application No. PCT/CN2014/094581, English Translation of International Search Report dated Aug. 3, 2015, 2 pages.
Foreign Communication From a Counterpart Application, PCT Application No. PCT/CN2014/094581, English Translation of Written Opinion dated Aug. 3, 2015, 5 pages.
Machine Translation and Abstract of Chinese Publication No. CN103186350, dated Jul. 3, 2013, 19 pages.
Foreign Communication From a Counterpart Application, Chinese Application No. 201480077812.4, dated Apr. 1, 2019, 7 pages.

* cited by examiner

RESOURCE SCHEDULING METHOD AND RELATED APPARATUS

CROSS-REFERENCE TO RELATED APPLICATIONS

This application is a continuation of International Patent Application No. PCT/CN2014/094581 filed on Dec. 23, 2014, which is hereby incorporated by reference in its entirety.

TECHNICAL FIELD

The present disclosure relates to the data processing field, and in particular, to a resource scheduling method and a related apparatus.

BACKGROUND

In recent years, with continuous progress of social economies and rapid development of science and technology, data scales of large, medium, and small enterprises rapidly expand accordingly. How to improve storage efficiency and an access rate of big data has an important practical application value. A distributed file system is a file management system suitable for big data storage. In this system, a physical storage resource is unnecessarily connected to a local node, and is connected to multiple nodes using a computer network. In the distributed file system, a big data block is divided into multiple small data blocks and the small data blocks are stored on multiple nodes such that the distributed file system has relatively high fault tolerance and a relatively high throughput. A HADOOP distributed file system (HDFS) is a commonly used file system that has high fault tolerance, can be deployed on a cheap machine, and is extremely suitable for use in a large-scaled data set. In the HDFS, data is grouped into a data block and the data block is stored on a disk of a data node (DN). An application task may read data from the data block on the disk, or write data into the data block on the disk. However, in a task of analyzing large-scale data, the application task needs to repeatedly read data on the disk and repeatedly write data to the disk. Consequently, data input/output (IO) takes a large amount of time, and a task runtime is excessively long.

An IO rate of a memory is much faster than an IO rate of a disk. Therefore, when performing resource scheduling, the HDFS at a current stage counts a historical quantity of times that each data block is accessed within a preset time period, then determines a data block that is accessed more frequently as a hotspot data block, and moves the hotspot data block into a memory of a DN. In this way, the application task can access the hotspot data block by directly using the memory of the DN, thereby improving data IO efficiency.

However, a historical quantity of times that a data block is accessed cannot accurately reflect a hotspot degree of the data block. Even if the historical quantity of times that the data block is accessed is relatively large, a quantity of times that the data block is accessed after the data block is moved into the memory may be extremely small. In this case, if the data block is moved into the memory, not only data IO efficiency cannot be prominently improved, but also memory resources are unnecessarily wasted.

SUMMARY

Embodiments of the present disclosure provide a resource scheduling method in order to improve data IO efficiency of a system.

A first aspect of the embodiments of the present disclosure provides a resource scheduling method, including determining a current task queue, where the task queue includes multiple to-be-executed application tasks, determining, for data blocks on a disk that are to be accessed by the application tasks, a quantity of times that each data block is to be accessed by the application tasks, determining a hotspot data block according to the quantity of times that each data block is to be accessed by the application tasks, and sending a move-in instruction to a local node of the hotspot data block, where the move-in instruction instructs to move the hotspot data block into a memory such that the hotspot data block can be accessed in the memory.

With reference to the first aspect of the embodiments the present disclosure, in a first implementation manner of the first aspect of the embodiments the present disclosure, determining a hotspot data block according to the quantity of times that each data block is to be accessed by the application tasks includes determining, as hotspot data blocks, top M data blocks that are to be accessed by the application tasks most frequently, where M is a preset value, or determining, as a hotspot data block, a data block that is to be accessed by the application tasks for at least N times, where N is a preset value.

With reference to the first aspect or the first implementation manner of the first aspect of the embodiments of the present disclosure, in a second implementation manner of the first aspect of the embodiments of the present disclosure, after sending a move-in instruction to a local node of the hotspot data block, the method further includes scheduling an application task corresponding to the hotspot data block to the local node of the hotspot data block if the local node of the hotspot data block has a vacant slot currently.

With reference to the first aspect or the first implementation manner of the first aspect of the embodiments of the present disclosure, in a third implementation manner of the first aspect of the embodiments of the present disclosure, after sending a move-in instruction to a local node of the hotspot data block, the method further includes sequentially executing, in descending order of quantities of times that all hotspot data blocks are to be accessed by the application tasks, application tasks corresponding to all the hotspot data blocks.

With reference to the first aspect or the first implementation manner of the first aspect of the embodiments of the present disclosure, in a fourth implementation manner of the first aspect of the embodiments of the present disclosure, the method further includes determining a quantity of hotspot data blocks that are to be accessed by each application task, and after sending a move-in instruction to a local node of the hotspot data block, the method further includes sequentially executing all application tasks in descending order of the quantities of the hotspot data blocks that are to be accessed by the application tasks.

With reference to any one of the first aspect, or the first to the fourth implementation manners of the first aspect of the embodiments of the present disclosure, in a fifth implementation manner of the first aspect of the embodiments of the present disclosure, the method further includes determining a quantity of times that each data block in the memory is to be accessed by the application tasks, determining, as non-hotspot data blocks, top P data blocks in the memory that are to be accessed by the application tasks least frequently, where P is a preset value, or determining, as a non-hotspot data block, a data block that is in the memory and that is to be accessed by the application tasks for a maximum of Q times, where Q is a preset value, and sending a move-out instruction to a local node of the non-hotspot data block, where the move-out instruction instructs to move the non-hotspot data block out of the memory.

With reference to any one of the first aspect, or the first to the fifth implementation manners of the first aspect of the embodiments of the present disclosure, in a sixth implementation manner of the first aspect of the embodiments of the present disclosure, determining a current task queue includes receiving an instruction for executing a to-be-executed job delivered by a client within a preset time period, and dividing the to-be-executed job into multiple to-be-executed application tasks, and determining a set of the multiple to-be-executed application tasks as the current task queue.

A second aspect of the embodiments of the present disclosure provides a resource scheduling apparatus, including a task queue determining module configured to determine a current task queue, where the task queue includes multiple to-be-executed application tasks, a first quantity-of-times determining module configured to determine, for data blocks on a disk that are to be accessed by the application tasks, a quantity of times that each data block is to be accessed by the application tasks, a hotspot data determining module configured to determine a hotspot data block according to the quantity of times that each data block is to be accessed by the application tasks, and a move-in instruction sending module configured to send a move-in instruction to a local node of the hotspot data block, where the move-in instruction instructs to move the hotspot data block into a memory such that the hotspot data block can be accessed in the memory.

With reference to the second aspect of the embodiments of the present disclosure, in a first implementation manner of the second aspect of the embodiments of the present disclosure, the hotspot data determining module is further configured to determine, as hotspot data blocks, top M data blocks that are to be accessed by the application tasks most frequently, where M is a preset value, or determine, as a hotspot data block, a data block to be accessed by the application tasks for at least N times, where N is a preset value.

With reference to the second aspect or the first implementation manner of the second aspect of the embodiments of the present disclosure, in a second implementation manner of the second aspect of the embodiments of the present disclosure, the apparatus further includes a task node scheduling module configured to schedule an application task corresponding to the hotspot data block to the local node of the hotspot data block after the move-in instruction sending module sends the move-in instruction to the local node of the hotspot data block, and when the local node of the hotspot data block has a vacant slot currently.

With reference to the second aspect or the first implementation manner of the second aspect of the embodiments of the present disclosure, in a third implementation manner of the second aspect of the embodiments of the present disclosure, the apparatus further includes a first order scheduling module configured to sequentially execute, in descending order of quantities of times that all hotspot data blocks are to be accessed by the application tasks, application tasks corresponding to all the hotspot data blocks after the move-in instruction sending module sends the move-in instruction to the local node of the hotspot data block.

With reference to the second aspect or the first implementation manner of the second aspect of the embodiments of the present disclosure, in a fourth implementation manner of the second aspect of the embodiments of the present disclosure, the apparatus further includes an access quantity determining module configured to determine a quantity of hotspot data blocks that are to be accessed by each application task, and the apparatus further includes a second order scheduling module configured to sequentially execute all application tasks in descending order of the quantities of the hotspot data blocks that are to be accessed by the application tasks after the move-in instruction sending module sends the move-in instruction to the local node of the hotspot data block.

With reference to any one of the second aspect, or the first to the fourth implementation manners of the second aspect of the embodiments of the present disclosure, in a fifth implementation manner of the second aspect of the embodiments of the present disclosure, the apparatus further includes a second quantity-of-times determining module configured to determine a quantity of times that each data block in the memory is to be accessed by the application tasks, a non-hotspot data determining module configured to determine, as non-hotspot data blocks, top P data blocks in the memory that are to be accessed by the application tasks least frequently, where P is a preset value, or determine, as a non-hotspot data block, a data block in the memory and to be accessed by the application tasks for a maximum of Q times, where Q is a preset value, and a move-out instruction sending module configured to send a move-out instruction to a local node of the non-hotspot data block, where the move-out instruction instructs to move the non-hotspot data block out of the memory.

With reference to any one of the second aspect, or the first to the fifth implementation manners of the second aspect of the embodiments of the present disclosure, in a sixth implementation manner of the second aspect of the embodiments of the present disclosure, the task queue determining module includes an instruction receiving unit configured to receive an instruction for executing a to-be-executed job delivered by a client within a preset time period, and a task division unit configured to divide the to-be-executed job into multiple to-be-executed application tasks, and determine a set of the multiple to-be-executed application tasks as the current task queue.

A third aspect of the embodiments of the present disclosure provides a resource scheduling apparatus, including an input apparatus, an output apparatus, a processor, and a memory, where the processor invokes an operation instruction stored in the memory and is configured to perform the steps of determining a current task queue, where the task queue includes multiple to-be-executed application tasks, determining, for data blocks on a disk that are to be accessed by the application tasks, a quantity of times that each data block is to be accessed by the application tasks, determining a hotspot data block according to the quantity of times that each data block is to be accessed by the application tasks, and sending a move-in instruction to a local node of the hotspot data block, where the move-in instruction instructs to move the hotspot data block into a memory such that the hotspot data block can be accessed in the memory.

With reference to the third aspect of the embodiments of the present disclosure, in a first implementation manner of the third aspect of the embodiments of the present disclosure, the processor further performs the steps of determining, as hotspot data blocks, top M data blocks that are to be accessed by the application tasks most frequently, where M is a preset value, or determining, as a hotspot data block, a data block to be accessed by the application tasks for at least N times, where N is a preset value.

With reference to the third aspect or the first implementation manner of the third aspect of the embodiments of the present disclosure, in a second implementation manner of the third aspect of the embodiments of the present disclosure, the processor further performs the step of scheduling an application task corresponding to the hotspot data block to the local node of the hotspot data block after sending the move-in instruction to the local node of the hotspot data block, if the local node of the hotspot data block has a vacant slot currently.

With reference to the third aspect or the first implementation manner of the third aspect of the embodiments of the present disclosure, in a third implementation manner of the third aspect of the embodiments of the present disclosure, the processor further performs the step of sequentially executing, in descending order of quantities of times that all hotspot data blocks are to be accessed by the application tasks, application tasks corresponding to all the hotspot data blocks after sending the move-in instruction to the local node of the hotspot data block.

With reference to the third aspect or the first implementation manner of the third aspect of the embodiments of the present disclosure, in a fourth implementation manner of the third aspect of the embodiments of the present disclosure, the processor further performs the steps of determining a quantity of hotspot data blocks that are to be accessed by each application task, and sequentially executing all application tasks in descending order of the quantities of the hotspot data blocks that are to be accessed by the application tasks after sending the move-in instruction to the local node of the hotspot data block.

With reference to any one of the third aspect, or the first to the fourth implementation manners of the third aspect of the embodiments of the present disclosure, in a fifth implementation manner of the third aspect of the embodiments of the present disclosure, the processor further performs the steps of determining a quantity of times that each data block in the memory is to be accessed by the application tasks, determining, as non-hotspot data blocks, top P data blocks in the memory that are to be accessed by the application tasks least frequently, where P is a preset value, or determining, as a non-hotspot data block, a data block in the memory and to be accessed by the application tasks for a maximum of Q times, where Q is a preset value, and sending a move-out instruction to a local node of the non-hotspot data block, where the move-out instruction instructs to move the non-hotspot data block out of the memory.

With reference to any one of the third aspect, or the first to the fifth implementation manners of the third aspect of the embodiments of the present disclosure, in a sixth implementation manner of the third aspect of the embodiments of the present disclosure, the processor further performs the steps of receiving an instruction for executing a to-be-executed job delivered by a client within a preset time period, and dividing the to-be-executed job into multiple to-be-executed application tasks, and determining a set of the multiple to-be-executed application tasks as the current task queue.

The embodiments of the present disclosure provide a resource scheduling method, including determining a current task queue, where the task queue includes multiple to-be-executed application tasks, determining, for data blocks on a disk that are to be accessed by the application tasks, a quantity of times that each data block is to be accessed by the application tasks, determining a hotspot data block according to the quantity of times that each data block is to be accessed by the application tasks, and sending a move-in instruction to a local node of the hotspot data block, where the move-in instruction instructs to move the hotspot data block into a memory such that the hotspot data block can be accessed in the memory. In the embodiments of the present disclosure, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in the embodiments of the present disclosure, the resource scheduling method can prominently improve data IO efficiency, and further shorten a runtime of the application tasks, without causing an unnecessary waste of memory resources.

DESCRIPTION OF EMBODIMENTS

Embodiments of the present disclosure provide a resource scheduling method in order to improve data IO efficiency. The present disclosure further provides a related resource scheduling apparatus. The resource scheduling method and the resource scheduling apparatus are separately described in the following.

Figure 1:
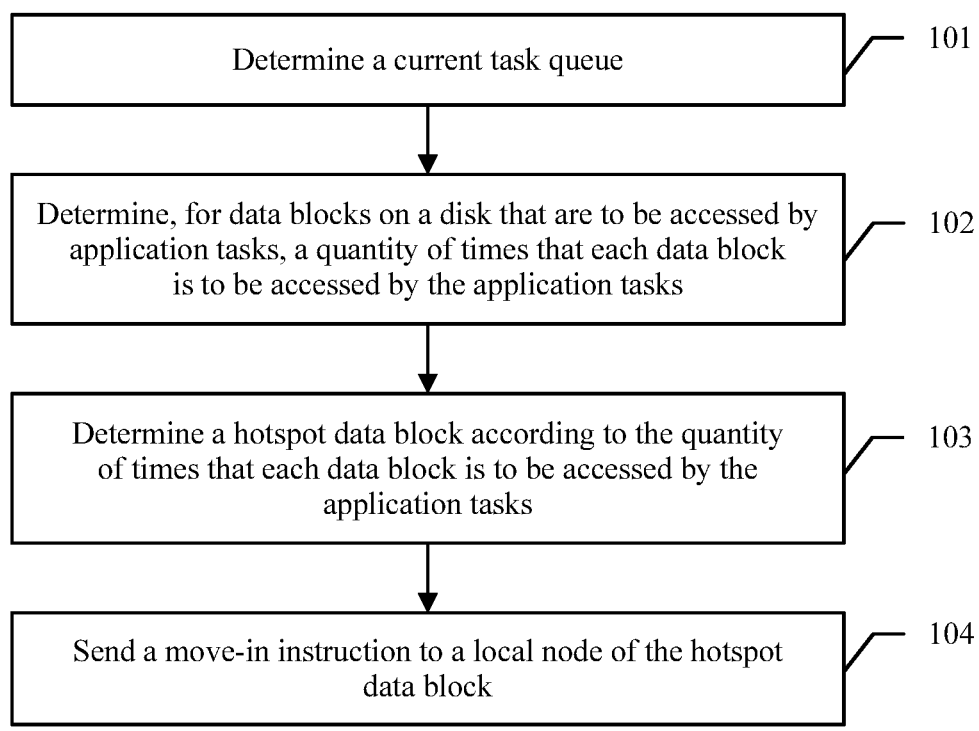
FIG. 1 is a flowchart of an embodiment of a resource scheduling method according to the embodiments of the present disclosure.

Referring to FIG. 1, a basic procedure of a resource scheduling method provided in an embodiment of the present disclosure mainly includes the following steps.

Step 101: Determine a current task queue.

A resource scheduling apparatus determines the current task queue. The task queue includes multiple to-be-executed application tasks.

There are many methods for determining the current task queue by the resource scheduling apparatus. A specific method is described in detail in the following embodiment, and is not limited herein.

Step 102: Determine, for data blocks on a disk that are to be accessed by application tasks, a quantity of times that each data block is to be accessed by the application tasks.

The application tasks in the task queue need to access the data blocks on the disk. In this embodiment, the resource scheduling apparatus determines, for the data blocks on the disk that are to be accessed by the application tasks in the task queue, the quantity of times that each data block is to be accessed by the application tasks.

Step 103: Determine a hotspot data block according to the quantity of times that each data block is to be accessed by the application tasks.

The resource scheduling apparatus determines the hotspot data block according to the quantity of times that each data block is to be accessed by the application tasks. The hotspot data block is a data block among the data blocks on the disk and to be accessed more frequently. There are many methods for determining the hotspot data block. A specific method is described in detail in the following embodiment, and is not limited herein.

Step 104: Send a move-in instruction to a local node of the hotspot data block.

After determining the hotspot data block, the resource scheduling apparatus sends the move-in instruction to the local node of the hotspot data block. The move-in instruction instructs the local node of the hotspot data block to move the hotspot data block from the disk into a memory such that the hotspot data block can be accessed in the memory. The local node of the hotspot data block refers to a node on which the hotspot data block is located. The local node of the hotspot data block preferentially moves the hotspot data block from the disk into a local memory.

This embodiment provides a resource scheduling method, including determining a current task queue, determining, for data blocks on a disk that are to be accessed by application tasks, a quantity of times that each data block is to be accessed by the application tasks, determining a hotspot data block according to the quantity of times that each data block is to be accessed by the application tasks, and sending a move-in instruction to a local node of the hotspot data block, where the move-in instruction instructs to move the hotspot data block into a memory such that the hotspot data block can be accessed in the memory. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling method can prominently improve data IO efficiency, and further shorten a runtime of the application tasks, without causing an unnecessary waste of memory resources.

The embodiment shown in FIG. 1 provides the basic procedure of the resource scheduling method provided in the embodiments of the present disclosure. The resource scheduling apparatus determines a hotspot degree of a data block using the to-be-executed application tasks in the current task queue, and there are many methods for determining the hotspot degree of the data block. Preferably, in another embodiment of the present disclosure, the method in step 103 in which the resource scheduling apparatus determines the hotspot data block according to the quantity of times that each data block is to be accessed by the application tasks may include determining, as hotspot data blocks, top M data blocks that are to be accessed by the application tasks most frequently, or determining, as a hotspot data block, a data block that is to be accessed by the application tasks for at least N times. Both M and N are preset values. In step 103, the resource scheduling apparatus may also determine the hotspot data block using another method according to the quantity of times that each data block is to be accessed by the application tasks, and this is not limited herein.

Preferably, in still another embodiment of the present disclosure, after step 104 in which the resource scheduling apparatus sends the move-in instruction to the local node of the hotspot data block, whether the local node of the hotspot data block has a vacant slot currently may be further determined. If the local node of the hotspot data block has a vacant slot currently, an application task corresponding to the hotspot data block is scheduled to the local node of the hotspot data block such that the application task does not need to access the hotspot data block across a node, thereby improving data IO efficiency of a system.

Figure 2:
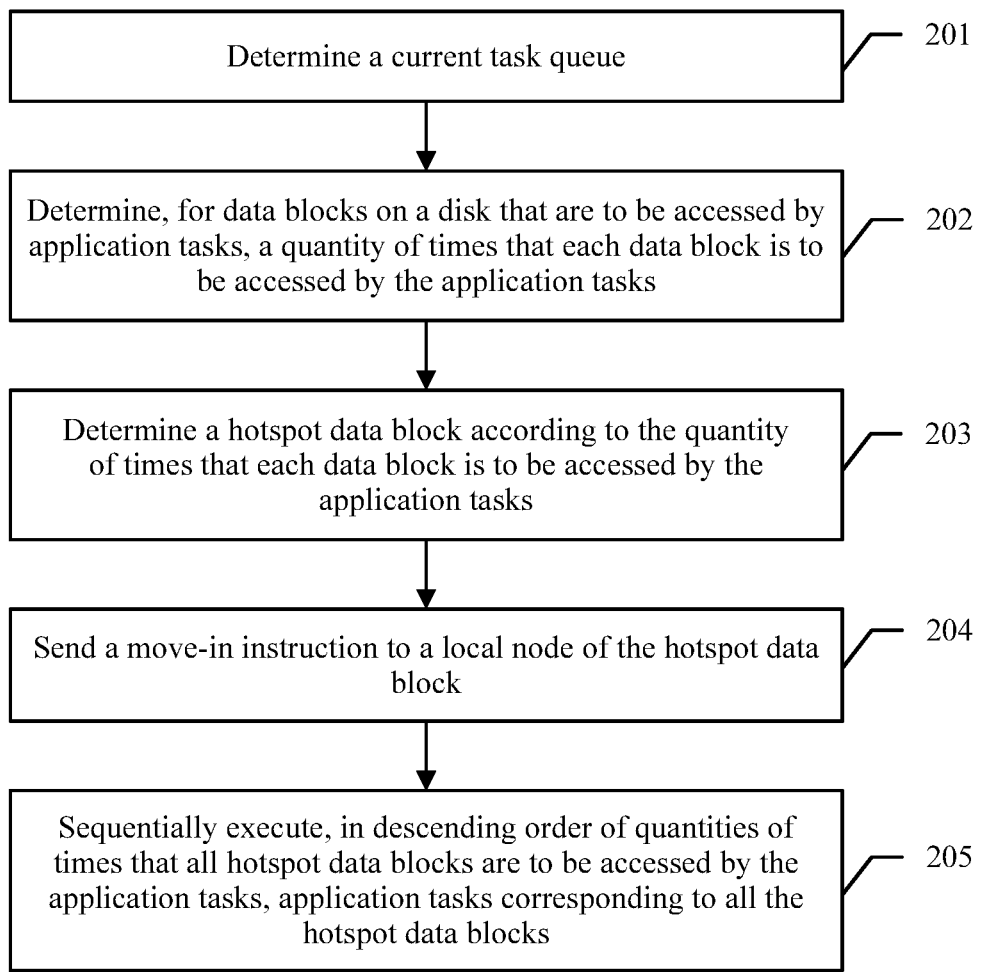
FIG. 2 is a flowchart of another embodiment of a resource scheduling method according to the embodiments of the present disclosure.

The embodiment shown in FIG. 1 explains in detail how to determine and schedule a hotspot data block according to the resource scheduling method provided in the present disclosure. Referring to FIG. 2, another resource scheduling method is provided in the following, and a job task corresponding to a hotspot data block may be scheduled based on the embodiment shown in FIG. 1. A basic procedure of the other resource scheduling method includes the following steps.

Step 201: Determine a current task queue.

Step 202: Determine, for data blocks on a disk that are to be accessed by application tasks, a quantity of times that each data block is to be accessed by the application tasks.

Step 203: Determine a hotspot data block according to the quantity of times that each data block is to be accessed by the application tasks.

Step 204: Send a move-in instruction to a local node of the hotspot data block.

Step 201 to step 204 are basically the same as step 101 to step 104, and details are not described herein again.

Step 205: Sequentially execute, in descending order of quantities of times that all hotspot data blocks are to be accessed by the application tasks, application tasks corresponding to all the hotspot data blocks.

After a resource scheduling apparatus sends the move-in instruction to the local node of the hotspot data block, the local node of the hotspot data block moves the hotspot data block into a memory. In this case, the application tasks in the task queue may directly access the hotspot data block in the memory. In this embodiment, the resource scheduling apparatus is further configured to schedule an execution order of the application tasks in the job queue. A specific method includes sequentially executing, in descending order of the quantities of times that all the hotspot data blocks are to be accessed by the application tasks, the application tasks corresponding to all the hotspot data blocks.

This embodiment provides a resource scheduling method, including determining a current task queue, determining, for data blocks on a disk that are to be accessed by application tasks, a quantity of times that each data block is to be accessed by the application tasks, determining a hotspot data block according to the quantity of times that each data block is to be accessed by the application tasks, sending a move-in instruction to a local node of the hotspot data block, where the move-in instruction instructs to move the hotspot data block into a memory such that the hotspot data block can be accessed in the memory, and sequentially executing, in descending order of quantities of times that all hotspot data blocks are to be accessed by the application tasks, application tasks corresponding to all the hotspot data blocks. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling method can prominently improve data IO efficiency, and further shorten a runtime of the application tasks, without causing an unnecessary waste of memory resources. In addition, the application tasks corresponding to all the hotspot data blocks are sequentially executed in descending order of the quantities of times that all the hotspot data blocks are to be accessed by the application tasks. In this way, a task corresponding to a data block with a higher hotspot degree can be executed first, thereby optimizing an execution order of the application tasks in the job queue, and improving efficiency of executing the application tasks by a system.

The resource scheduling apparatus may also schedule the execution order of the application tasks in the job queue using another method. Preferably, in another embodiment of the present disclosure, a step may further be included before step 205. The resource scheduling apparatus determines a quantity of hotspot data blocks that are to be accessed by each application task. Step 205 may be replaced with a step of sequentially executing all application tasks in descending order of the quantities of the hotspot data blocks that are to be accessed by the application tasks. In this way, an application task that accesses the hotspot data block more frequently can be executed first. In addition, the execution order of the application tasks in the job queue can be optimized, and efficiency of executing the application tasks by the system can be improved.

Figure 3:
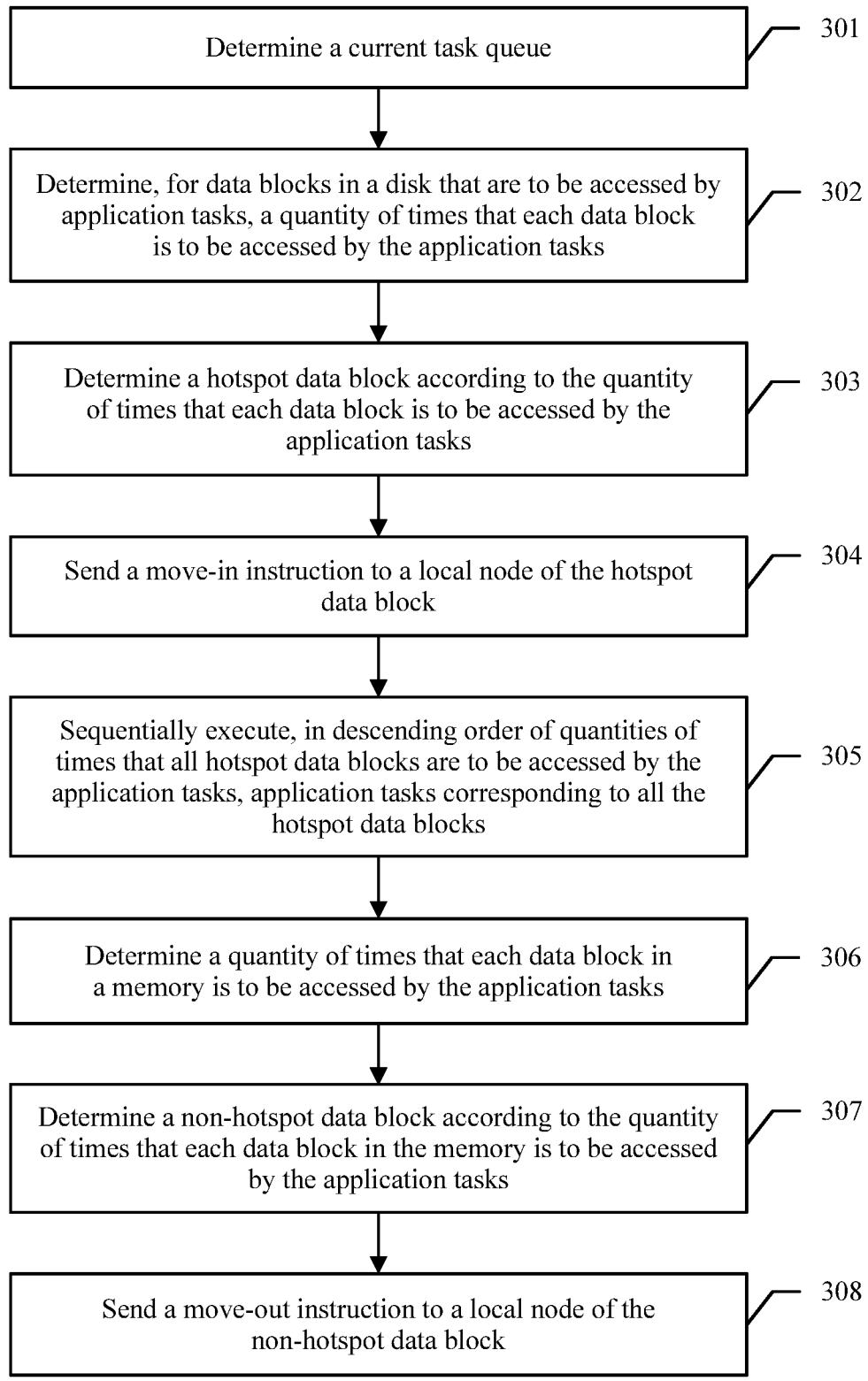
FIG. 3 is a flowchart of another embodiment of a resource scheduling method according to the embodiments of the present disclosure.

The method provided in the embodiment shown in FIG. 2 provides a method for optimizing the execution order of the application tasks in the job queue after moving the hotspot data block into the memory. However, in an actual application, the memory can accommodate a limited quantity of data blocks. In an application process of the resource scheduling method provided in the present disclosure, hotspot data blocks are continuously moved into the memory. The memory cannot accommodate a new hotspot data block when a quantity of data blocks moved into the memory reaches an upper limit of the memory. In order that the resource scheduling method provided in the present disclosure can be continuously implemented, it is required to ensure that the memory has enough space to accommodate a new data block. Therefore, the present disclosure provides a new embodiment in order to ensure that a memory of a node has enough space to accommodate a new data block. Referring to FIG. 3, a basic procedure of still another resource scheduling method provided in an embodiment of the present disclosure includes the following steps.

Step 301: Determine a current task queue.

Step 302: Determine, for data blocks on a disk that are to be accessed by application tasks, a quantity of times that each data block is to be accessed by the application tasks.

Step 303: Determine a hotspot data block according to the quantity of times that each data block is to be accessed by the application tasks.

Step 304: Send a move-in instruction to a local node of the hotspot data block.

Step 305: Sequentially execute, in descending order of quantities of times that all hotspot data blocks are to be accessed by the application tasks, application tasks corresponding to all the hotspot data blocks.

Step 301 to step 305 are basically the same as step 201 to step 205, and details are not described herein again.

A memory can accommodate a limited quantity of data blocks. In an application process of the resource scheduling method provided in the present disclosure, hotspot data blocks are continuously moved into the memory. The memory cannot accommodate a new hotspot data block when a quantity of data blocks moved into the memory reaches an upper limit of the memory. In order that the resource scheduling method provided in the present disclosure can continuously operate, it is required to ensure that the memory has enough space to accommodate a new data block. Therefore, in this embodiment, a resource scheduling apparatus determines, according to the task queue, which data blocks that are among data blocks in the memory and that are to be accessed less frequently, and moves the data blocks that are to be accessed less frequently out of the memory. For a specific method, refer to step 306 to step 308.

Step 306: Determine a quantity of times that each data block in a memory is to be accessed by the application tasks.

The resource scheduling apparatus determines the quantity of times that each data block among the data blocks in the memory is to be accessed by the application tasks in the task queue.

Step 307: Determine a non-hotspot data block according to the quantity of times that each data block in the memory is to be accessed by the application tasks.

The resource scheduling apparatus determines the non-hotspot data block according to the quantity of times that each data block in the memory is to be accessed by the application tasks. The non-hotspot data block indicates a data block among the data blocks in the memory to be accessed by the application tasks less frequently. There are many methods for determining the non-hotspot data block. For example, top P data blocks in the memory that are to be accessed by the application tasks least frequently are determined as non-hotspot data blocks, and P is a preset value, or a data block in the memory and that is to be accessed by the application tasks for a maximum of Q times is determined as a non-hotspot data block, and Q is a preset value. The resource scheduling apparatus may also determine the non-hotspot data block using another method, and this is not limited herein.

Step 308: Send a move-out instruction to a local node of the non-hotspot data block.

After determining the non-hotspot data block, the resource scheduling apparatus sends the move-out instruction to the local node of the non-hotspot data block. The move-out instruction instructs the local node of the non-hotspot data block to move the non-hotspot data block from the memory to the disk.

This embodiment provides a resource scheduling method, including determining a current task queue, determining, for data blocks on a disk that are to be accessed by application tasks, a quantity of times that each data block is to be accessed by the application tasks, determining a hotspot data block according to the quantity of times that each data block is to be accessed by the application tasks, sending a move-in instruction to a local node of the hotspot data block, where the move-in instruction instructs to move the hotspot data block into a memory such that the hotspot data block can be accessed in the memory, sequentially executing, in descending order of quantities of times that all hotspot data blocks are to be accessed by the application tasks, application tasks corresponding to all the hotspot data blocks, determining a quantity of times that each data block in the memory is to be accessed by the application tasks, determining a non-hotspot data block according to the quantity of times that each data block in the memory is to be accessed by the application tasks, and sending a move-out instruction to a local node of the non-hotspot data block in order to instruct the local node of the non-hotspot data block to move the non-hotspot data block from the memory to the disk. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling method can prominently improve data IO efficiency, and further shorten a runtime of the application tasks, without causing an unnecessary waste of memory resources. In addition, the application tasks corresponding to all the hotspot data blocks are sequentially executed, in descending order of the quantities of times that all the hotspot data blocks are to be accessed by the application tasks. In this way, a task corresponding to a data block with a higher hotspot degree can be executed first, thereby optimizing an execution order of the application tasks in the job queue, and improving efficiency of executing the application tasks by a system. In this embodiment, a resource scheduling apparatus also determines the non-hotspot data block in the memory, and instructs the local node of the non-hotspot data block to move the non-hotspot data block out of the memory. In this way, data blocks stored in the memory are data blocks with a relatively high hotspot degree, thereby dynamically optimizing a hotspot data block in the memory.

Figure 4:
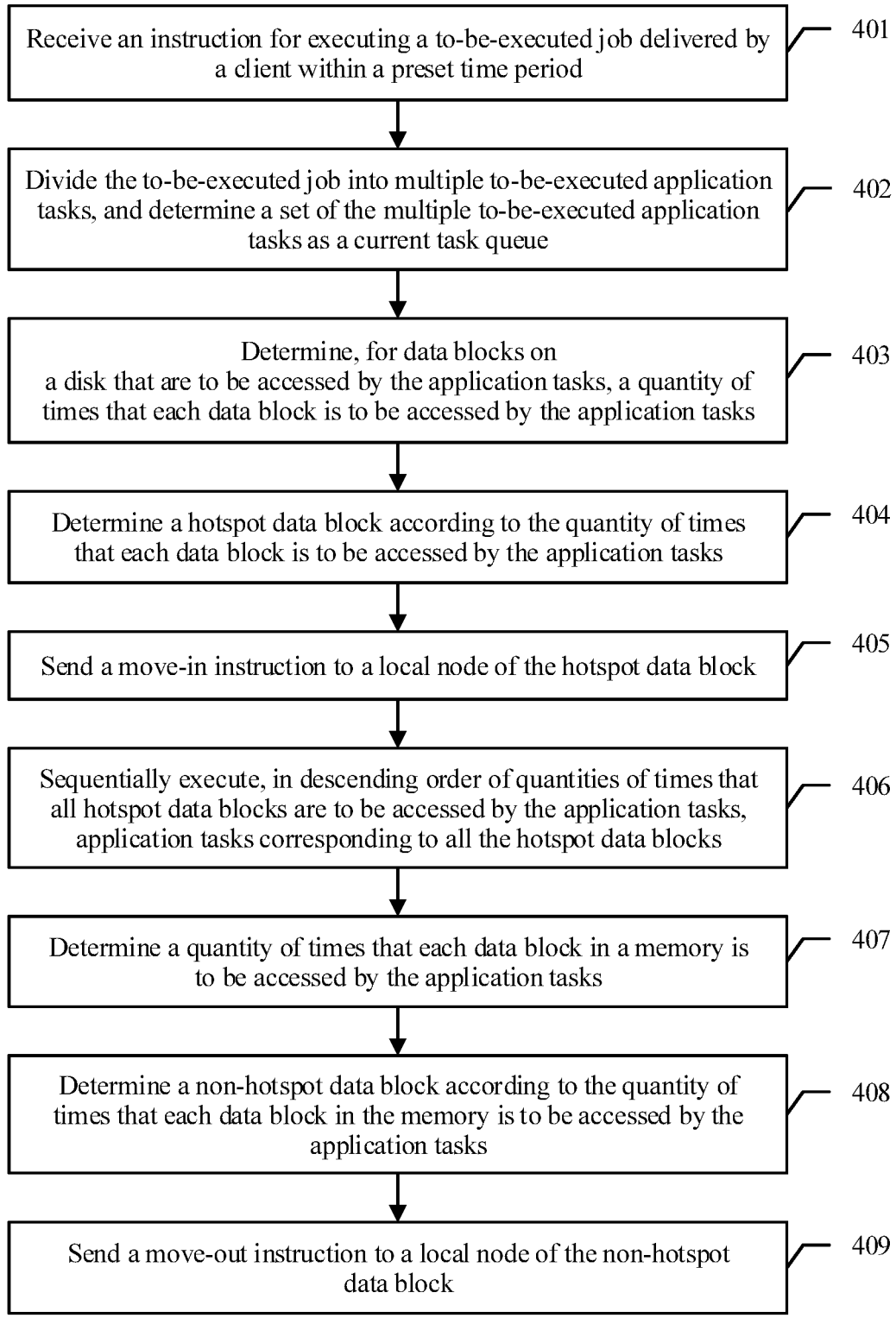
FIG. 4 is a flowchart of another embodiment of a resource scheduling method according to the embodiments of the present disclosure.

In all of the resource scheduling methods provided in the embodiments shown in FIG. 1 to FIG. 3, hotspot data is determined according to a job queue. A more detailed resource scheduling method is provided in the following to describe in detail how to determine a job queue. Referring to FIG. 4, a basic procedure of the resource scheduling method includes the following steps.

Step 401: Receive an instruction for executing a to-be-executed job delivered by a client within a preset time period.

A resource scheduling apparatus receives the instruction for executing the to-be-executed job delivered by the client within the preset time period. The execution instruction instructs the resource scheduling apparatus to execute the to-be-executed job.

The preset time period may be a time period that is manually set, may be a default time period for the resource scheduling apparatus, or may be another time period, and this is not limited herein.

Step 402: Divide the to-be-executed job into multiple to-be-executed application tasks, and determine a set of the multiple to-be-executed application tasks as a current task queue.

It may be understood that each to-be-executed job may be divided into one or more to-be-executed application tasks, and each to-be-executed application task needs to access one data block. For example, a to-be-executed job needs to access a data file with a size of 128 megabytes (MB), and in a distributed file system, a size of each data block is 32 MB. In this case, the resource scheduling apparatus divides the to-be-executed job into four to-be-executed application tasks, and each to-be-executed application task accesses one 32 MB data block.

In this embodiment, the to-be-executed job may include only one job. However, preferably, the to-be-executed job may include multiple jobs. The resource scheduling apparatus divides each of the multiple jobs into multiple to-be-executed application tasks, and determines a set of the multiple to-be-executed application tasks as the current task queue.

Step 403: Determine, for data blocks on a disk that are to be accessed by the application tasks, a quantity of times that each data block is to be accessed by the application tasks.

Step 404: Determine a hotspot data block according to the quantity of times that each data block is to be accessed by the application tasks.

Step 405: Send a move-in instruction to a local node of the hotspot data block.

Step 406: Sequentially execute, in descending order of quantities of times that all hotspot data blocks are to be accessed by the application tasks, application tasks corresponding to all the hotspot data blocks.

Step 407: Determine a quantity of times that each data block in a memory is to be accessed by the application tasks.

Step 408: Determine a non-hotspot data block according to the quantity of times that each data block in the memory is to be accessed by the application tasks.

Step 409: Send a move-out instruction to a local node of the non-hotspot data block.

Step 403 to step 409 are basically the same as step 302 to step 308, and details are not described herein again.

This embodiment provides a resource scheduling method, including receiving an instruction for executing a to-be-executed job and that is delivered by a client within a preset time period, dividing the to-be-executed job into multiple to-be-executed application tasks, and determining a set of the multiple to-be-executed application tasks as a current task queue, determining, for data blocks on a disk that are to be accessed by the application tasks, a quantity of times that each data block is to be accessed by the application tasks, determining a hotspot data block according to the quantity of times that each data block is to be accessed by the application tasks, sending a move-in instruction to a local node of the hotspot data block, where the move-in instruction instructs to move the hotspot data block into a memory such that the hotspot data block can be accessed in the memory, sequentially executing, in descending order of quantities of times that all hotspot data blocks are to be accessed by the application tasks, application tasks corresponding to all the hotspot data blocks, determining a quantity of times that each data block in the memory is to be accessed by the application tasks, determining a non-hotspot data block according to the quantity of times that each data block in the memory is to be accessed by the application tasks, and sending a move-out instruction to a local node of the non-hotspot data block in order to instruct the local node of the non-hotspot data block to move the non-hotspot data block from the memory to the disk. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling method can prominently improve data IO efficiency, and further shorten a runtime of the application tasks, without causing an unnecessary waste of memory resources. In addition, in this embodiment, a resource scheduling apparatus further schedules an execution order of the application tasks in the job queue such that a task corresponding to a hotspot data block that is to be accessed by the application tasks more frequently is preferably executed. In this embodiment, the resource scheduling apparatus also determines the non-hotspot data block in the memory, and instructs the local node of the non-hotspot data block to move the non-hotspot data block out of the memory. In this way, data blocks stored in the memory are data blocks with a relatively high hotspot degree, thereby dynamically optimizing a hotspot data block in the memory.

For ease of understanding the foregoing embodiment, the following provides descriptions using a specific application scenario of the foregoing embodiment as an example.

In a distributed file system, the resource scheduling apparatus receives an instruction that is for executing a to-be-executed job and that is delivered by a client within a preset time period. The execution instruction instructs the resource scheduling apparatus to execute the to-be-executed job, and the to-be-executed job needs to access a data file with a size of 128 MB.

In the distributed file system, a size of each data block is 32 MB. In this case, the resource scheduling apparatus divides the to-be-executed job into four to-be-executed application tasks, and each to-be-executed application task accesses one 32 MB data block. The resource scheduling apparatus determines a set of the four to-be-executed application tasks as a current task queue.

The resource scheduling apparatus determines, for data blocks on a disk that are to be accessed by the application tasks in the task queue, a quantity of times that each data block is to be accessed by the application tasks. It is learned that, there are a total of 100 data blocks, in which 20 data blocks are accessed for 300 times, 30 data blocks are accessed for 200 times, and 50 data blocks are accessed for 100 times.

The resource scheduling apparatus determines, as a hotspot data block, a data block that is to be accessed by the application tasks for at least 150 times, that is, determines, as hotspot data blocks, the 20 data blocks that are accessed for 300 times and the 30 data blocks that are accessed for 200 times.

The resource scheduling apparatus sends a move-in instruction to a local node of the hotspot data block. After receiving the move-in instruction, the local node of the hotspot data block moves the hotspot data block from the disk into a memory such that the hotspot data block can be accessed in the memory.

The resource scheduling apparatus executes, in descending order of quantities of times that the data blocks are to be accessed by the application tasks, application tasks corresponding to the 20 data blocks that are accessed for 300 times, and then executes application tasks corresponding to the 20 data blocks that are accessed for 300 times.

Currently, there are 60 data blocks in the memory. After executing an application task corresponding to the hotspot data block, the resource scheduling apparatus determines a quantity of times that each data block among the data blocks in the memory is to be accessed by the application tasks in the task queue. It is learned that 30 data blocks are accessed by the application tasks in the task queue for 100 times, and 30 data blocks are accessed by the application tasks in the task queue for 160 times.

The resource scheduling apparatus determines, as a non-hotspot data block, a data block in the memory and that is to be accessed by the application tasks for a maximum of 150 times, that is, determines, as non-hotspot data blocks, the 30 data blocks that are accessed by the application tasks in the task queue for 100 times.

After determining the non-hotspot data block, the resource scheduling apparatus sends a move-out instruction to a local node of the non-hotspot data block. After receiving the move-out instruction, the local node of the non-hotspot data block moves the non-hotspot data block from the memory to the disk.

Figure 5:
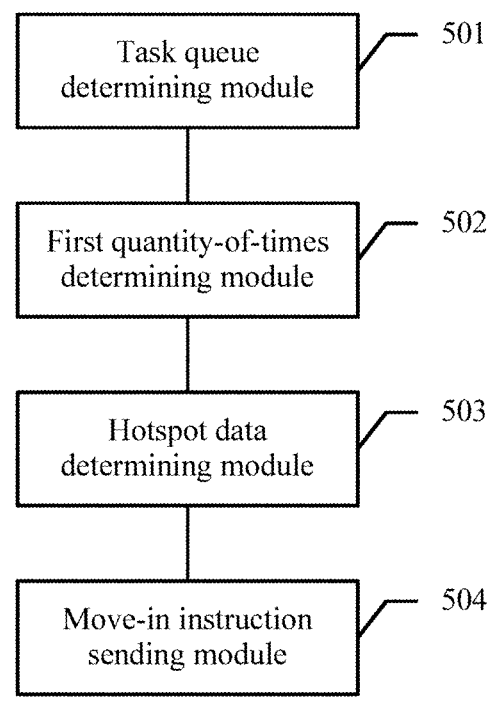
FIG. 5 is a schematic diagram of an embodiment of a resource scheduling apparatus according to the embodiments of the present disclosure.

An embodiment of the present disclosure further provides a resource scheduling apparatus configured to implement the methods provided in the embodiments shown in FIG. 1 to FIG. 4. Referring to FIG. 5, a basic structure of the resource scheduling apparatus mainly includes a task queue determining module 501, a first quantity-of-times determining module 502, a hotspot data determining module 503, and a move-in instruction sending module 504.

The task queue determining module 501 is configured to determine a current task queue.

The task queue determining module 501 determines the current task queue. The task queue includes multiple to-be-executed application tasks.

The first quantity-of-times determining module 502 is configured to determine, for data blocks on a disk that are to be accessed by the application tasks, a quantity of times that each data block is to be accessed by the application tasks.

The application tasks in the task queue need to access the data blocks on the disk. In this embodiment, the first quantity-of-times determining module 502 determines, for the data blocks on the disk that are to be accessed by the application tasks in the task queue, the quantity of times that each data block is to be accessed by the application tasks.

The hotspot data determining module 503 is configured to determine a hotspot data block according to the quantity of times that each data block is to be accessed by the application tasks.

The hotspot data determining module 503 determines the hotspot data block according to the quantity of times that each data block is to be accessed by the application tasks. The hotspot data block is a data block among the data blocks on the disk and that is to be accessed more frequently. There are many methods for determining the hotspot data block. A specific method is described in detail in the following embodiment, and is not limited herein.

The move-in instruction sending module 504 is configured to send a move-in instruction to a local node of the hotspot data block.

After the hotspot data determining module 503 determines the hotspot data block, the move-in instruction sending module 504 sends the move-in instruction to the local node of the hotspot data block. The move-in instruction instructs the local node of the hotspot data block to move the hotspot data block from the disk into a memory such that the hotspot data block can be accessed in the memory. The local node of the hotspot data block refers to a node on which the hotspot data block is located. The local node of the hotspot data block preferentially moves the hotspot data block from the disk into a local memory.

This embodiment provides a resource scheduling method, including a task queue determining module 501 configured to determine a current task queue, a first quantity-of-times determining module 502 configured to determine, for data blocks on a disk that are to be accessed by application tasks, a quantity of times that each data block is to be accessed by the application tasks, a hotspot data determining module 503 configured to determine a hotspot data block according to the quantity of times that each data block is to be accessed by the application tasks, and a move-in instruction sending module 504 configured to send a move-in instruction to a local node of the hotspot data block, where the move-in instruction instructs to move the hotspot data block into a memory such that the hotspot data block can be accessed in the memory. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling apparatus can prominently improve data IO efficiency, and further shorten a runtime of the application tasks, without causing an unnecessary waste of memory resources.

The embodiment shown in FIG. 1 provides the basic structure of the resource scheduling apparatus provided in the embodiments of the present disclosure. The hotspot data determining module 503 determines a hotspot degree of a data block using the to-be-executed application tasks in the current task queue, and there are many methods for determining the hotspot degree of the data block. Preferably, in another embodiment of the present disclosure, the hotspot data determining module 503 may be further configured to determine, as hotspot data blocks, top M data blocks that are to be accessed by the application tasks most frequently, or determine, as a hotspot data block, a data block that is to be accessed by the application tasks for at least N times. Both M and N are preset values. The hotspot data determining module 503 may also determine the hotspot data block using another method according to the quantity of times that each data block is to be accessed by the application tasks, and this is not limited herein.

Preferably, in still another embodiment of the present disclosure, the resource scheduling apparatus may further include a task node scheduling module (not shown) configured to, after the move-in instruction sending module 504 sends the move-in instruction to the local node of the hotspot data block, when the local node of the hotspot data block has a vacant slot currently, schedule an application task corresponding to the hotspot data block to the local node of the hotspot data block such that the application task does not need to access the hotspot data block across a node, thereby improving data IO efficiency of a system.

Figure 6:
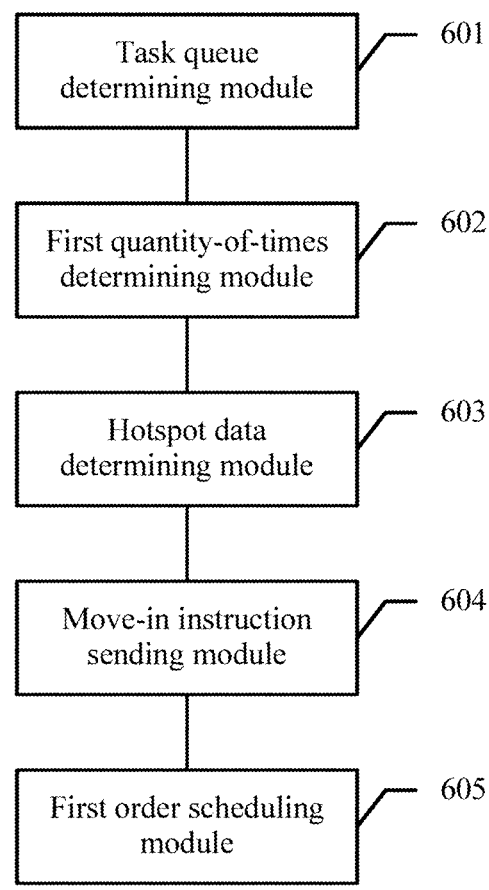
FIG. 6 is a schematic diagram of another embodiment of a resource scheduling apparatus according to the embodiments of the present disclosure.

The embodiment shown in FIG. 5 explains in detail how the resource scheduling apparatus provided in the present disclosure determines and schedules a hotspot data block. Referring to FIG. 6, another resource scheduling apparatus is provided in the following, and a job task corresponding to a hotspot data block may be scheduled based on the embodiment shown in FIG. 5. A basic structure of the other resource scheduling apparatus includes a task queue determining module 601, a first quantity-of-times determining module 602, a hotspot data determining module 603, a move-in instruction sending module 604, and a first order scheduling module 605.

The task queue determining module 601 is configured to determine a current task queue.

The first quantity-of-times determining module 602 is configured to determine, for data blocks on a disk that are to be accessed by application tasks, a quantity of times that each data block is to be accessed by the application tasks.

The hotspot data determining module 603 is configured to determine a hotspot data block according to the quantity of times that each data block is to be accessed by the application tasks.

The move-in instruction sending module 604 is configured to send a move-in instruction to a local node of the hotspot data block.

Modules 601 to 604 are basically the same as the modules 501 to 504, and details are not described herein again.

The first order scheduling module 605 is configured to sequentially execute, in descending order of quantities of times that all hotspot data blocks are to be accessed by the application tasks, application tasks corresponding to all the hotspot data blocks after the move-in instruction sending module 604 sends the move-in instruction to the local node of the hotspot data block.

After the move-in instruction sending module 604 sends the move-in instruction to the local node of the hotspot data block, the local node of the hotspot data block moves the hotspot data block into a memory. In this case, the application tasks in the task queue may directly access the hotspot data block in the memory. In this embodiment, the resource scheduling apparatus is further configured to schedule an execution order of the application tasks in the job queue. A specific method is as follows. The first order scheduling module 605 sequentially executes, in descending order of the quantities of times that all the hotspot data blocks are to be accessed by the application tasks, the application tasks corresponding to all the hotspot data blocks.

This embodiment provides a resource scheduling apparatus, including a task queue determining module 601 configured to determine a current task queue, a first quantity-of-times determining module 602 configured to determine, for data blocks on a disk that are to be accessed by application tasks, a quantity of times that each data block is to be accessed by the application tasks, a hotspot data determining module 603 configured to determine a hotspot data block according to the quantity of times that each data block is to be accessed by the application tasks, a move-in instruction sending module 604 configured to send a move-in instruction to a local node of the hotspot data block, where the move-in instruction instructs to move the hotspot data block into a memory such that the hotspot data block can be accessed in the memory, and a first order scheduling module 605 configured to sequentially execute, in descending order of quantities of times that all hotspot data blocks are to be accessed by the application tasks, application tasks corresponding to all the hotspot data block. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling apparatus can prominently improve data IO efficiency, and further shorten a runtime of the application tasks, without causing an unnecessary waste of memory resources. In addition, the application tasks corresponding to all the hotspot data blocks are sequentially executed in descending order of the quantities of times that all the hotspot data blocks are to be accessed by the application tasks. In this way, a task corresponding to a data block with a higher hotspot degree can be executed first, thereby optimizing an execution order of the application tasks in the job queue, and improving efficiency of executing the application tasks by a system.

The resource scheduling apparatus may also schedule the execution order of the application tasks in the job queue using another method. Preferably, in another embodiment of the present disclosure, the resource scheduling apparatus may further include an access quantity determining module (not shown) configured to determine a quantity of hotspot data blocks that are to be accessed by each application task. The first order scheduling module 605 may be replaced with a second order scheduling module (not shown), and the second order scheduling module is configured to sequentially execute all application tasks in descending order of the quantities of the hotspot data blocks that are to be accessed by the application tasks after the move-in instruction sending module 604 sends the move-in instruction to the local node of the hotspot data block. In this way, an application task that accesses the hotspot data block more frequently can be executed first. In addition, the execution order of the application tasks in the job queue can be optimized, and efficiency of executing the application tasks by the system can be improved.

Figure 7:
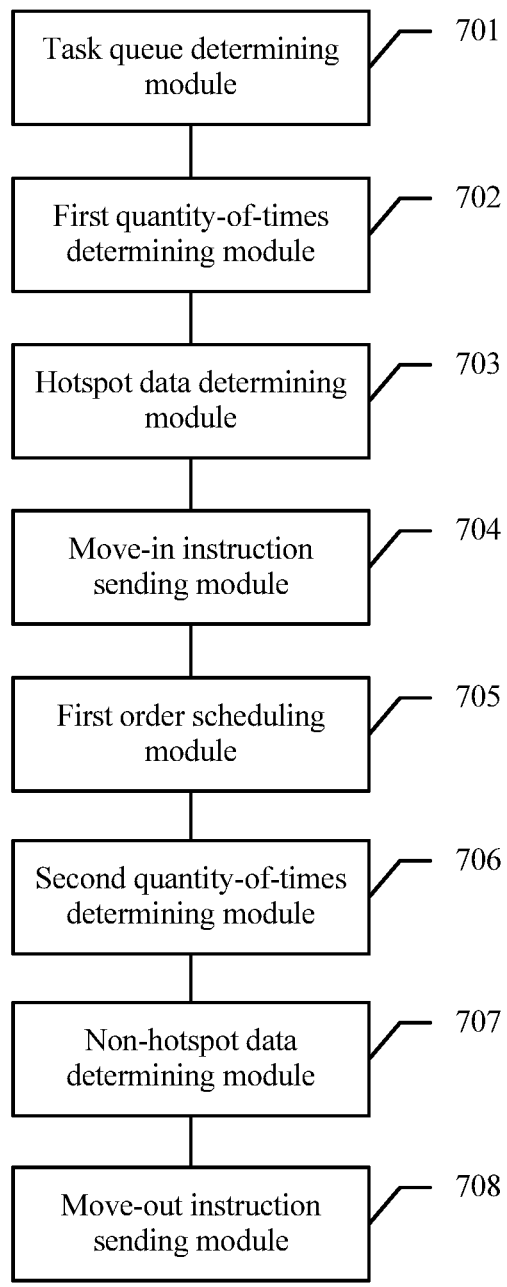
FIG. 7 is a schematic diagram of another embodiment of a resource scheduling apparatus according to the embodiments of the present disclosure.

The apparatus provided in the embodiment shown in FIG. 6 can optimize the execution order of the application tasks in the job queue after moving the hotspot data block into the memory. However, in an actual application, the memory can accommodate a limited quantity of data blocks. In an application process of the resource scheduling apparatus provided in the present disclosure, hotspot data blocks are continuously moved into the memory. The memory cannot accommodate a new hotspot data block when a quantity of data blocks moved into the memory reaches an upper limit of the memory. In order that the resource scheduling apparatus provided in the present disclosure can continuously operate, it is required to ensure that the memory has enough space to accommodate a new data block. Therefore, the present disclosure provides a new embodiment in order to ensure that a memory of a node has enough space to accommodate a new data block. Referring to FIG. 7, a basic structure of still another resource scheduling apparatus provided in an embodiment of the present disclosure includes a task queue determining module 701, a first quantity-of-times determining module 702, a hotspot data determining module 703, a move-in instruction sending module 704, a first order scheduling module 705, a second quantity-of-times determining module 706, a non-hotspot data determining module 707, and a move-out instruction sending module 708.

The task queue determining module 701 is configured to determine a current task queue.

The first quantity-of-times determining module 702 is configured to determine, for data blocks on a disk that are to be accessed by application tasks, a quantity of times that each data block is to be accessed by the application tasks.

The hotspot data determining module 703 is configured to determine a hotspot data block according to the quantity of times that each data block is to be accessed by the application tasks.

The move-in instruction sending module 704 is configured to send a move-in instruction to a local node of the hotspot data block.

The first order scheduling module 705 is configured to sequentially execute, in descending order of quantities of times that all hotspot data blocks are to be accessed by the application tasks, application tasks corresponding to all the hotspot data blocks after the move-in instruction sending module 704 sends the move-in instruction to the local node of the hotspot data block.

Modules 701 to 705 are basically the same as the modules 601 to 605, and details are not described herein again.

The second quantity-of-times determining module 706 is configured to determine a quantity of times that each data block in a memory is to be accessed by the application tasks.

The second quantity-of-times determining module 706 determines the quantity of times that each data block among the data blocks in the memory is to be accessed by the application tasks in the task queue.

The non-hotspot data determining module 707 is configured to determine a non-hotspot data block according to the quantity of times that each data block in the memory is to be accessed by the application tasks.

The non-hotspot data determining module 707 determines the non-hotspot data block according to the quantity of times that each data block in the memory is to be accessed by the application tasks. The non-hotspot data block indicates a data block among the data blocks in the memory and that is to be accessed by the application tasks less frequently. There are many methods for determining the non-hotspot data block. For example, top P data blocks in the memory that are to be accessed by the application tasks least frequently are determined as non-hotspot data blocks, and P is a preset value, or a data block in the memory and that is to be accessed by the application tasks for a maximum of Q times is determined as a non-hotspot data block, and Q is a preset value. The non-hotspot data determining module 707 may also determine the non-hotspot data block using another method, and this is not limited herein.

The move-out instruction sending module 708 is configured to send a move-out instruction to a local node of the non-hotspot data block.

After the non-hotspot data determining module 707 determines the non-hotspot data block, the move-out instruction sending module 708 sends the move-out instruction to the local node of the non-hotspot data block. The move-out instruction instructs the local node of the non-hotspot data block to move the non-hotspot data block from the memory to the disk.

This embodiment provides a resource scheduling apparatus, including a task queue determining module 701 configured to determine a current task queue, a first quantity-of-times determining module 702 configured to determine, for data blocks on a disk that are to be accessed by application tasks, a quantity of times that each data block is to be accessed by the application tasks, a hotspot data determining module 703 configured to determine a hotspot data block according to the quantity of times that each data block is to be accessed by the application tasks, a move-in instruction sending module 704 configured to send a move-in instruction to a local node of the hotspot data block, where the move-in instruction instructs to move the hotspot data block into a memory such that the hotspot data block can be accessed in the memory, a first order scheduling module 705 configured to sequentially execute, in descending order of quantities of times that all hotspot data blocks are to be accessed by the application tasks, application tasks corresponding to all the hotspot data blocks, a second quantity-of-times determining module 706 configured to determine a quantity of times that each data block in the memory is to be accessed by the application tasks, a non-hotspot data determining module 707 configured to determine a non-hotspot data block according to the quantity of times that each data block in the memory is to be accessed by the application tasks, and a move-out instruction sending module 708 configured to send a move-out instruction to a local node of the non-hotspot data block, to instruct the local node of the non-hotspot data block to move the non-hotspot data block from the memory to the disk. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling apparatus can prominently improve data IO efficiency, and further shorten a runtime of the application tasks, without causing an unnecessary waste of memory resources. In addition, the application tasks corresponding to all the hotspot data blocks are sequentially executed in descending order of the quantities of times that all the hotspot data blocks are to be accessed by the application tasks. In this way, a task corresponding to a data block with a higher hotspot degree can be executed first, thereby optimizing an execution order of the application tasks in the job queue, and improving efficiency of executing the application tasks by a system. The non-hotspot data determining module 707 further determines the non-hotspot data block in the memory. The move-out instruction sending module 708 instructs the local node of the non-hotspot data block to move the non-hotspot data block out of the memory. In this way, data blocks stored in the memory are data blocks with a relatively high hotspot degree, thereby dynamically optimizing a hotspot data block in the memory.

Figure 8:
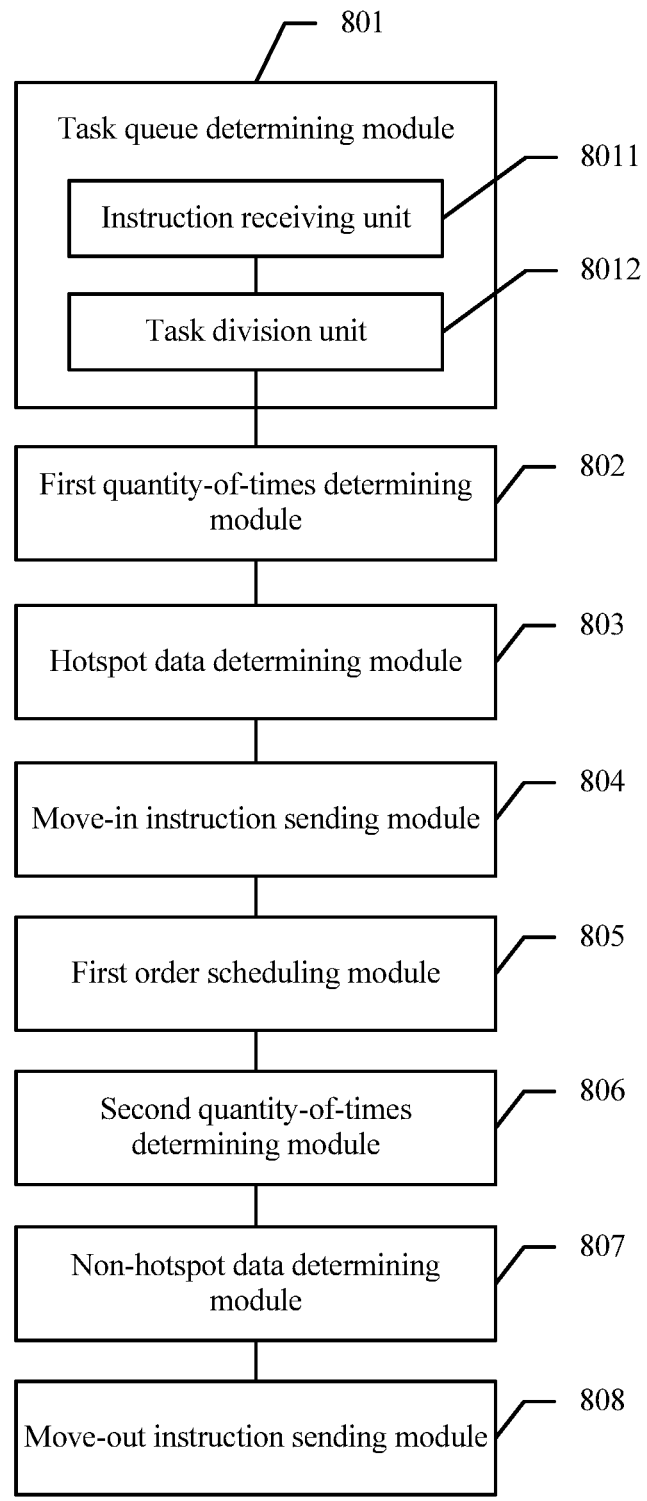
FIG. 8 is a schematic diagram of another embodiment of a resource scheduling apparatus according to the embodiments of the present disclosure.

The resource scheduling apparatuses provided in the embodiments shown in FIG. 5 to FIG. 7 all determine hotspot data according to a job queue. A more detailed resource scheduling apparatus is provided in the following to describe in detail how to determine a job queue. Referring to FIG. 8, a basic structure of the resource scheduling apparatus includes a task queue determining module 801, a first quantity-of-times determining module 802, a hotspot data determining module 803, a move-in instruction sending module 804, a first order scheduling module 805, a second quantity-of-times determining module 806, a non-hotspot data determining module 807, and a move-out instruction sending module 808.

The task queue determining module 801 is configured to determine a current task queue. In this embodiment, the task queue determining module 801 includes an instruction receiving unit 8011 and a task division unit 8012.

The instruction receiving unit 8011 is configured to receive an instruction for executing a to-be-executed job delivered by a client within a preset time period.

The instruction receiving unit 8011 receives the instruction for executing the to-be-executed job delivered by the client within the preset time period. The execution instruction instructs the resource scheduling apparatus to execute the to-be-executed job.

The preset time period may be a time period that is manually set, may be a default time period for the resource scheduling apparatus, or may be another time period, and this is not limited herein.

The task division unit 8012 is configured to divide the to-be-executed job into multiple to-be-executed application tasks, and determine a set of the multiple to-be-executed application tasks as the current task queue.

It may be understood that each to-be-executed job may be divided into one or more to-be-executed application tasks, and each to-be-executed application task needs to access one data block. For example, a to-be-executed job needs to access a data file with a size of 128 MB, and in a distributed file system, a size of each data block is 32 MB. In this case, the resource scheduling apparatus divides the to-be-executed job into four to-be-executed application tasks, and each to-be-executed application task is used to access one 32 MB data block.

In this embodiment, the to-be-executed job may include only one job. However, preferably, the to-be-executed job may include multiple jobs. The task division unit 8012 divides each of the multiple jobs into multiple to-be-executed application tasks, and determines a set of the multiple to-be-executed application tasks as the current task queue.

The first quantity-of-times determining module 802 is configured to determine, for data blocks on a disk that are to be accessed by the application tasks, a quantity of times that each data block is to be accessed by the application tasks.

The hotspot data determining module 803 is configured to determine a hotspot data block according to the quantity of times that each data block is to be accessed by the application tasks.

The move-in instruction sending module 804 is configured to send a move-in instruction to a local node of the hotspot data block.

The first order scheduling module 805 is configured to sequentially execute, in descending order of quantities of times that all hotspot data blocks are to be accessed by the application tasks, application tasks corresponding to all the hotspot data blocks after the move-in instruction sending module 804 sends the move-in instruction to the local node of the hotspot data block.

The second quantity-of-times determining module 806 is configured to determine a quantity of times that each data block in a memory is to be accessed by the application tasks.

The non-hotspot data determining module 807 is configured to determine a non-hotspot data block according to the quantity of times that each data block in the memory is to be accessed by the application tasks.

The move-out instruction sending module 808 is configured to send a move-out instruction to a local node of the non-hotspot data block.

Modules 802 to 808 are basically the same as the modules 702 to 708, and details are not described herein again.

This embodiment provides a resource scheduling apparatus, including an instruction receiving unit 8011 configured to receive an instruction for executing a to-be-executed job delivered by a client within a preset time period, a task division unit 8012 configured to divide the to-be-executed job into multiple to-be-executed application tasks, and determine a set of the multiple to-be-executed application tasks as a current task queue, a first quantity-of-times determining module 802 configured to determine, for data blocks on a disk that are to be accessed by the application tasks, a quantity of times that each data block is to be accessed by the application tasks, a hotspot data determining module 803 configured to determine a hotspot data block according to the quantity of times that each data block is to be accessed by the application tasks, a move-in instruction sending module 804 configured to send a move-in instruction to a local node of the hotspot data block, where the move-in instruction instructs to move the hotspot data block into a memory such that the hotspot data block can be accessed in the memory, a first order scheduling module 805 configured to sequentially execute, in descending order of quantities of times that all hotspot data blocks are to be accessed by the application tasks, application tasks corresponding to all the hotspot data blocks, a second quantity-of-times determining module 806 configured to determine a quantity of times that each data block in the memory is to be accessed by the application tasks, a non-hotspot data determining module 807 configured to determine a non-hotspot data block according to the quantity of times that each data block in the memory is to be accessed by the application tasks, and a move-out instruction sending module 808 configured to send a move-out instruction to a local node of the non-hotspot data block in order to instruct the local node of the non-hotspot data block to move the non-hotspot data block from the memory to the disk. In this embodiment, a hotspot degree of a data block is determined using the to-be-executed application tasks in the current task queue. This ensures that the determined hotspot data block is accessed by the to-be-executed application tasks more frequently after the hotspot data block is moved into the memory. Compared with the other approaches that a hotspot data block is determined according to a historical quantity of times that the hotspot data block is accessed, in this embodiment, the resource scheduling apparatus can prominently improve data IO efficiency, and further shorten a runtime of the application tasks, without causing an unnecessary waste of memory resources. In addition, in this embodiment, the first order scheduling module 805 further schedules an execution order of the application tasks in the job queue such that a task corresponding to a hotspot data block that is to be accessed by the application tasks more frequently is preferably executed. In this embodiment, the non-hotspot data determining module 807 further determines the non-hotspot data block in the memory. The move-out instruction sending module 808 instructs the local node of the non-hotspot data block to move the non-hotspot data block out of the memory. In this way, data blocks stored in the memory are data blocks with a relatively high hotspot degree, thereby dynamically optimizing a hotspot data block in the memory.

For ease of understanding the foregoing embodiment, the following provides descriptions using a specific application scenario of the foregoing embodiment as an example.

In a distributed file system, the instruction receiving unit 8011 receives an instruction that is for executing a to-be-executed job and that is delivered by a client within a preset time period. The execution instruction instructs the resource scheduling apparatus to execute the to-be-executed job, and the to-be-executed job needs to access a data file with a size of 128 MB.

In the distributed file system, a size of each data block is 32 MB. In this case, the task division unit 8012 divides the to-be-executed job into four to-be-executed application tasks, and each to-be-executed application task is used to access one 32 MB data block. The task division unit 8012 determines a set of the four to-be-executed application tasks as a current task queue.

The first quantity-of-times determining module 802 determines, for data blocks on a disk that are to be accessed by the application tasks in the task queue, a quantity of times that each data block is to be accessed by the application tasks. It is learned that, there are a total of 100 data blocks, in which 20 data blocks are accessed for 300 times, 30 data blocks are accessed for 200 times, and 50 data blocks are accessed for 100 times.

The hotspot data determining module 803 determines a data block that is to be accessed by the application tasks for at least 150 times as a hotspot data block, that is, determines the 20 data blocks that are accessed for 300 times and the 30 data blocks that are accessed for 200 times as hotspot data blocks.

The move-in instruction sending module 804 sends a move-in instruction to a local node of the hotspot data block. After receiving the move-in instruction, the local node of the hotspot data block moves the hotspot data block from the disk into a memory such that the hotspot data block can be accessed in the memory.

The first order scheduling module 805 executes, in descending order of quantities of times that the data blocks are to be accessed by the application tasks, application tasks corresponding to the 20 data blocks that are accessed for 300 times, and then executes application tasks corresponding to the 20 data blocks that are accessed for 300 times.

Currently, there are 60 data blocks in the memory. After executing an application task corresponding to the hotspot data block, the second quantity-of-times determining module 806 determines a quantity of times that each data block among the data blocks in the memory is to be accessed by the application tasks in the task queue. It is learned that 30 data blocks are accessed by the application tasks in the task queue for 100 times, and 30 data blocks are accessed by the application tasks in the task queue for 160 times.

The non-hotspot data determining module 807 determines, as a non-hotspot data block, a data block that is in the memory and that is to be accessed by the application tasks for a maximum of 150 times, that is, determines, as non-hotspot data blocks, the 30 data blocks that are accessed by the application tasks in the task queue for 100 times.

After the non-hotspot data determining module 807 determines the non-hotspot data block, the move-out instruction sending module 808 sends a move-out instruction to a local node of the non-hotspot data block. After receiving the move-out instruction, the local node of the non-hotspot data block moves the non-hotspot data block from the memory to the disk.

Figure 9:
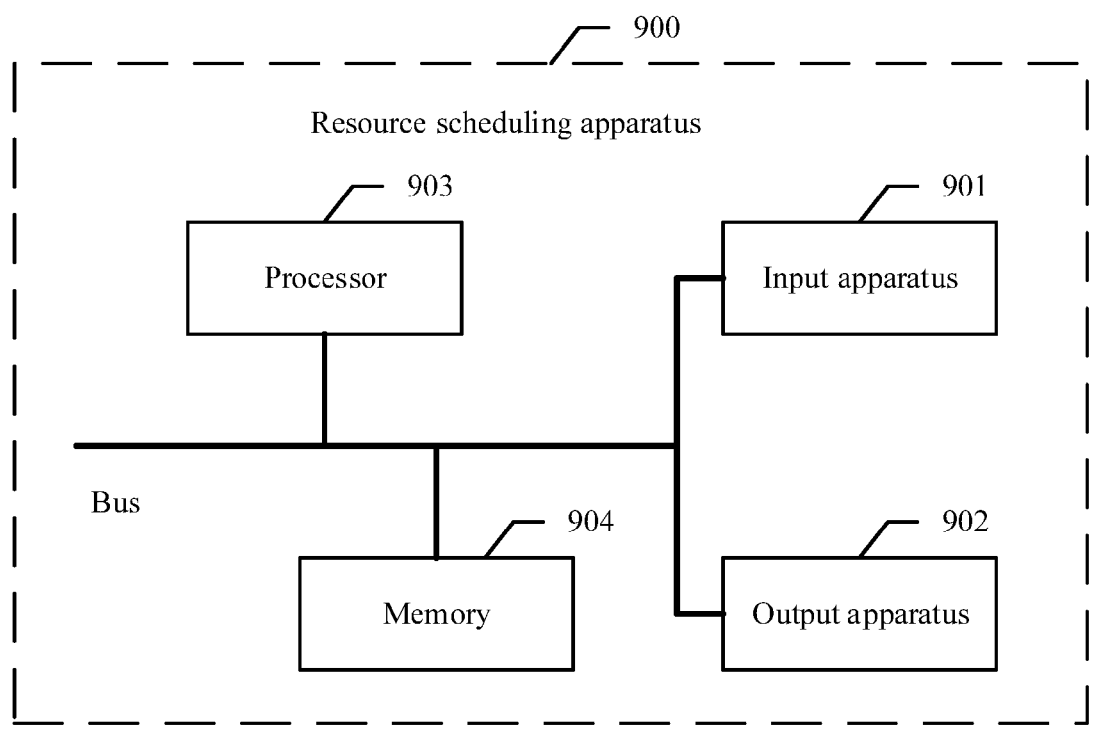
FIG. 9 is a schematic diagram of another embodiment of a resource scheduling apparatus according to the embodiments of the present disclosure.

The foregoing describes the resource scheduling apparatus in the embodiments of the present disclosure from a perspective of a unitized functional entity. The following describes a resource scheduling apparatus in an embodiment of the present disclosure from a perspective of hardware processing. Referring to FIG. 9, a resource scheduling apparatus 900 in this embodiment of the present disclosure includes an input apparatus 901, an output apparatus 902, a processor 903, and a memory 904. The resource scheduling apparatus 900 may include one or more processors 903, and one processor 903 is used as an example in FIG. 9. In some embodiments of the present disclosure, the input apparatus 901, the output apparatus 902, the processor 903, and the memory 904 may be connected using a bus or in another manner. In FIG. 9, a bus is used as an example for connection.

The processor 903 invokes an operation instruction stored in the memory 904 and is configured to perform the steps of determining a current task queue, where the task queue includes multiple to-be-executed application tasks, determining, for data blocks on a disk that are to be accessed by the application tasks, a quantity of times that each data block is to be accessed by the application tasks, determining a hotspot data block according to the quantity of times that each data block is to be accessed by the application tasks, and sending a move-in instruction to a local node of the hotspot data block, where the move-in instruction instructs to move the hotspot data block into a memory such that the hotspot data block can be accessed in the memory.

In some embodiments of the present disclosure, the processor 903 further performs the steps of determining, as hotspot data blocks, top M data blocks that are to be accessed by the application tasks most frequently, where M is a preset value, or determining, as a hotspot data block, a data block that is to be accessed by the application tasks for at least N times, where N is a preset value.

In some embodiments of the present disclosure, the processor 903 further performs the step of scheduling an application task corresponding to the hotspot data block to the local node of the hotspot data block after sending the move-in instruction to the local node of the hotspot data block, if the local node of the hotspot data block has a vacant slot currently.

In some embodiments of the present disclosure, the processor 903 further performs the step of sequentially executing, in descending order of quantities of times that all hotspot data block are to be accessed by the application tasks, application tasks corresponding to all the hotspot data blocks after sending the move-in instruction to the local node of the hotspot data block.

In some embodiments of the present disclosure, the processor 903 further performs the steps of determining a quantity of hotspot data blocks that are to be accessed by each application task, and sequentially executing all application tasks in descending order of the quantities of the hotspot data blocks that are to be accessed by the application tasks after sending the move-in instruction to the local node of the hotspot data block.

In some embodiments of the present disclosure, the processor 903 further performs the steps of determining a quantity of times that each data block in the memory is to be accessed by the application tasks, determining, as non-hotspot data blocks, top P data blocks in the memory that are to be accessed by the application tasks least frequently, where P is a preset value, or determining, as a non-hotspot data block, a data block in the memory and that is to be accessed by the application tasks for a maximum of Q times, where Q is a preset value, and sending a move-out instruction to a local node of the non-hotspot data block, where the move-out instruction instructs to move the non-hotspot data block out of the memory.

In some embodiments of the present disclosure, the processor 903 further performs the steps of receiving an instruction for executing a to-be-executed job delivered by a client within a preset time period, and dividing the to-be-executed job into multiple to-be-executed application tasks, and determining a set of the multiple to-be-executed application tasks as the current task queue.

It may be clearly understood by a person skilled in the art that, for the purpose of convenient and brief description, for a detailed working process of the foregoing system, module, and unit, refer to a corresponding process in the foregoing method embodiments, and details are not described herein again.

In the several embodiments provided in this application, it should be understood that the disclosed system and method may be implemented in other manners. For example, the described system embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

What is claimed is:

1. A resource scheduling method, comprising:
   determining a current task queue, wherein the current task queue comprises a plurality of to-be-executed application tasks;
   determining, for data blocks to be accessed by the plurality of to-be-executed application tasks, a quantity of times that each data block is to be accessed by the plurality of to-be-executed application tasks;
   determining a hotspot data block according to the quantity of times that each data block is to be accessed by the plurality of to-be-executed application tasks;
   sending a move-in instruction to a local node of the hotspot data block, wherein the move-in instruction instructs moving the hotspot data block into a memory of the local node;
   determining a quality of times that each data block in the memory is to be accessed by the plurality of to-be-executed application tasks;
   determining as a non-hotspot data block, a data block in the memory to be accessed by the plurality of to-be-executed application tasks for a maximum of Q times, wherein Q is a preset value; and
   sending a move-out instruction to a local node of the non-hotspot data block, wherein the move-out instruction instructs moving the non-hotspot data block out of the memory.

2. The resource scheduling method according to claim 1, wherein determining the hotspot data block comprises determining, as hotspot data blocks, top M data blocks to be accessed by the plurality of to-be-executed application tasks most frequently, and wherein M is a preset value.

3. The resource scheduling method according to claim 1, wherein determining the hotspot data block comprises determining, as the hotspot data block, a data block to be accessed by the plurality of to-be-executed application tasks for at least N times, and wherein N is a preset value.

4. The resource scheduling method according to claim 1, further comprising scheduling an application task of the plurality of to-be-executed application tasks corresponding to the hotspot data block to the local node of the hotspot data block when the local node of the hotspot data block comprises a current vacant slot.

5. The resource scheduling method according to claim 1, further comprising sequentially executing, in descending order of quantities of times that all hotspot data blocks are to be accessed by the plurality of to-be-executed application tasks, application tasks of the plurality of to-be-executed application tasks corresponding to all the hotspot data blocks.

6. The resource scheduling method according to claim 1, further comprising:
   determining a quantity of hotspot data blocks to be accessed by each application task; and
   sequentially executing the plurality of to-be-executed application tasks in descending order of the quantities of the hotspot data blocks to be accessed by the plurality of to-be-executed application tasks after sending the move-in instruction to the local node of the hotspot data block.

7. The resource scheduling method according to claim 1, further comprising:
   determining a quantity of times that each data block in the memory is to be accessed by the plurality of to-be-executed application tasks;
   determining, as non-hotspot data blocks, top P data blocks in the memory to be accessed by the plurality of to-be-executed application tasks least frequently, wherein P is a preset value; and
   sending a move-out instruction to a local node of the non-hotspot data block, wherein the move-out instruction instructs moving the non-hotspot data block out of the memory.

8. The resource scheduling method according to claim 1, wherein determining the current task queue comprises:
   receiving an instruction for executing a to-be-executed job delivered by a client within a preset time period;
   dividing the to-be-executed job into the plurality of to-be-executed application tasks; and
   determining the plurality of to-be-executed application tasks as the current task queue.

9. A resource scheduling apparatus, comprising:
   an input apparatus;
   an output apparatus coupled to the input apparatus;
   a processor coupled to the input apparatus and the output apparatus; and
   a memory comprising instructions and coupled to the input apparatus, the output apparatus and the processor, wherein the instructions cause the processor to be configured to:
      determine a current task queue, wherein the current task queue comprises a plurality of to-be-executed application tasks;
      determine, for data blocks to be accessed by the plurality of to-be-executed application tasks, a quantity of times that each data block is to be accessed by the plurality of to-be-executed application tasks;
      determine a hotspot data block according to the quantity of times that each data block is to be accessed by the plurality of to-be-executed application tasks;
      send a move-in instruction to a local node of the hotspot data block, wherein the move-in instruction instructs moving the hotspot data block into a memory of the local node;
      determine a quantity of times that each data block in the memory is to be accessed by the plurality of to-be executed application tasks;
      determine, as a non-hotpot data block, a data block in the memory to be accessed by the plurality of to-be-executed application tasks for a maximum of Q times, wherein Q is a preset value; and
      send a move-out instruction to a local node of the non-hotspot data block, wherein the move-out instruction instructs moving the non-hotspot data block out of the memory.

10. The resource scheduling apparatus according to claim 9, wherein the instructions further cause the processor to be configured to determine, as hotspot data blocks, top M data blocks to be accessed by the plurality of to-be-executed application tasks most frequently, and wherein M is a preset value.

11. The resource scheduling apparatus according to claim 9, wherein the instructions further cause the processor to be configured to determine, as the hotspot data block, a data block to be accessed by the plurality of to-be-executed application tasks for at least N times, and wherein N is a preset value.

12. The resource scheduling apparatus according to claim 9, wherein the instructions further cause the processor to be configured to schedule an application task of the plurality of to-be-executed application tasks corresponding to the hotspot data block to the local node of the hotspot data block when the local node of the hotspot data block comprises a current vacant slot.

13. The resource scheduling apparatus according to claim 9, wherein the instructions further cause the processor to be configured to sequentially execute, in descending order of quantities of times that all hotspot data blocks are to be accessed by the plurality of to-be-executed application tasks, application tasks of the plurality of to-be-executed application tasks corresponding to all the hotspot data blocks.

14. The resource scheduling apparatus according to claim 9, wherein the instructions further cause the processor to be configured to:
   determine a quantity of hotspot data blocks to be accessed by each application task; and
   sequentially execute the plurality of to-be-executed application tasks in descending order of the quantities of the hotspot data blocks to be accessed by the plurality of to-be-executed application tasks.

15. The resource scheduling apparatus according to claim 9, wherein the instructions further cause the processor to be configured to:
   determine a quantity of times that each data block in the memory is to be accessed by the plurality of to-be-executed application tasks;
   determine, as non-hotspot data blocks, top P data blocks in the memory to be accessed by the plurality of to-be-executed application tasks least frequently, wherein P is a preset value; and
   send a move-out instruction to a local node of the non-hotspot data block, wherein the move-out instruction instructs moving the non-hotspot data block out of the memory.

16. The resource scheduling apparatus according to claim 9, wherein the instructions further cause the processor to be configured to:
   receive an instruction for executing a to-be-executed job delivered by a client within a preset time period;
   divide the to-be-executed job into the plurality of to-be-executed application tasks; and
   determine the plurality of to-be-executed application tasks as the current task queue.

17. A non-transitory computer-readable storage medium comprising instructions, in which when executed by a computer, cause the computer to carry out the steps of:

determining a current task queue, wherein the current task queue comprises a plurality of to-be-executed application tasks;

determining, for data blocks to be accessed by the plurality of to-be-executed application tasks, a quantity of times that each data block is to be accessed by the plurality of to-be-executed application tasks;

determining a hotspot data block according to the quantity of times that each data block is to be accessed by the plurality of to-be-executed application tasks;

sending a move-in instruction to a local node of the hotspot data block, wherein the move-in instruction instructs moving the hotspot data block into a memory;

determining a quantity of times that each data block in the memory is to be accessed by the plurality of to-be-executed application tasks;

determining, as a non-hotspot data block, a data block in the memory to be accessed by the plurality of to-be-executed application tasks for a maximum of Q times, wherein Q is a preset value; and sending a move-out instruction to a local node of the non-hotspot data block, wherein the move-out instruction instructs moving the non-hotspot data block out of the memory.

* * * * *